US011982200B1

(12) United States Patent
Gajowniczek et al.

(10) Patent No.: US 11,982,200 B1
(45) Date of Patent: May 14, 2024

(54) STRUCTURE WITH STRUCTURAL REINFORCEMENT PATTERNS

(71) Applicant: Pratt & Whitney Canada Corp., Longueuil (CA)

(72) Inventors: Krzysztof Gajowniczek, Rzeszów (PL); Pawel Helmecki, Rzeszów (PL)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 18/213,508

(22) Filed: Jun. 23, 2023

(51) Int. Cl.
*F01D 25/24* (2006.01)

(52) U.S. Cl.
CPC .......... *F01D 25/24* (2013.01); *F05D 2220/32* (2013.01); *F05D 2230/20* (2013.01); *F05D 2240/90* (2013.01)

(58) Field of Classification Search
CPC .. F01D 25/24; F05D 2220/32; F05D 2230/20; F05D 2240/90
See application file for complete search history.

(56) References Cited

U.S. PATENT DOCUMENTS

| | | | | |
|---|---|---|---|---|
| 4,801,070 | A | 1/1989 | Hom et al. | |
| 5,735,163 | A | 4/1998 | Sato et al. | |
| 6,053,696 | A * | 4/2000 | Roberts | F01D 21/045 415/200 |
| 6,064,352 | A * | 5/2000 | Silverman | H01Q 15/142 343/912 |
| 7,013,551 | B2 | 3/2006 | Green et al. | |
| 8,042,315 | B2 | 10/2011 | Ashton et al. | |
| 8,257,600 | B2 | 9/2012 | Raji | |
| 10,072,523 | B2 | 9/2018 | Yoshida et al. | |
| 11,230,971 | B1 | 1/2022 | Karafillis et al. | |
| 2010/0192351 | A1 | 8/2010 | Runnemalm | |
| 2010/0192504 | A1* | 8/2010 | Willey | F03D 80/00 52/651.01 |
| 2017/0159555 | A1* | 6/2017 | Reyes | F02B 37/24 |
| 2017/0226891 | A1* | 8/2017 | Twelves, Jr. | B32B 15/011 |

FOREIGN PATENT DOCUMENTS

| | | | |
|---|---|---|---|
| EP | 0906799 | B1 | 6/2001 |
| EP | 1708832 | B1 | 9/2007 |
| EP | 3338920 | B1 | 9/2021 |
| EP | 3569396 | B1 | 11/2022 |

* cited by examiner

*Primary Examiner* — Courtney D Heinle
*Assistant Examiner* — Theodore C Ribadeneyra
(74) *Attorney, Agent, or Firm* — CANTOR COLBURN LLP

(57) ABSTRACT

A component configured for use in a gas turbine engine, including: a wall portion formed from sheet metal and extending between two end portions, the wall portion being stamped with a plurality of instances of a pre-defined three dimensional shape structured to increase a stiffness of the wall portion in a direction normal to the wall portion, each instance of the plurality of instances of the pre-defined three dimensional shape being orientated at 90 degrees with respect to each other adjacent instance of the plurality of instances, wherein the three dimensional shape has a pair of curved distal peripheral end portions that are at opposite ends of the three dimensional shape and each pair of curved distal peripheral end portions are connected to each other by a pair of opposing concave peripheral portions that curve towards each other at a mid-section.

20 Claims, 5 Drawing Sheets

STRUCTURE WITH STRUCTURAL REINFORCEMENT PATTERNS

BACKGROUND

This disclosure relates to structures for use in gas turbine engines, and more particularly to a structure with a structural reinforcement pattern.

Portions of aircraft engines are composed of light structures, which are made of thin sheet metal. While such existing structures may be suitable for their intended purposes, improvements to such structures are always desirable.

BRIEF DESCRIPTION

Disclosed is a component configured for use in a gas turbine engine, including: a wall portion formed from sheet metal and extending between two end portions, the wall portion being stamped with a plurality of instances of a pre-defined three dimensional shape structured to increase a stiffness of the wall portion in a direction normal to the wall portion, each instance of the plurality of instances of the pre-defined three dimensional shape being orientated at 90 degrees with respect to each other adjacent instance of the plurality of instances, wherein the three dimensional shape has a pair of curved distal peripheral end portions that are at opposite ends of the three dimensional shape and each pair of curved distal peripheral end portions are connected to each other by a pair of opposing concave peripheral portions that curve towards each other at a mid-section.

In addition to one or more of the features described above, or as an alternative to any of the foregoing embodiments, the wall portion is cylindrical in shape.

In addition to one or more of the features described above, or as an alternative to any of the foregoing embodiments, the wall portion extends between two end portions that are ring shaped.

In addition to one or more of the features described above, or as an alternative to any of the foregoing embodiments, the wall portion is conical in shape.

In addition to one or more of the features described above, or as an alternative to any of the foregoing embodiments, the wall portion is a linear panel and is rectangular in shape.

In addition to one or more of the features described above, or as an alternative to any of the foregoing embodiments, the component is a casing for the gas turbine engine.

In addition to one or more of the features described above, or as an alternative to any of the foregoing embodiments, the wall portion is cylindrical in shape.

In addition to one or more of the features described above, or as an alternative to any of the foregoing embodiments, the wall portion extends between two end portions that are ring shaped.

In addition to one or more of the features described above, or as an alternative to any of the foregoing embodiments, the wall portion is conical in shape.

Also disclosed is a portion of a gas turbine engine, including: a component, the component including a wall portion formed from sheet metal and extending between two end portions, the wall portion being stamped with a plurality of instances of a pre-defined three dimensional shape structured to increase a stiffness of the wall portion in a direction normal to the wall portion, each instance of the plurality of instances of the pre-defined three dimensional shape being orientated 90 degrees with respect to each other adjacent instance of the plurality of instances, wherein the three dimensional shape has a pair of curved distal peripheral end portions that are at opposite ends of the three dimensional shape and each pair of curved distal peripheral end portions are connected to each other by a pair of opposing concave peripheral portions that curve towards each other at a mid-section.

In addition to one or more of the features described above, or as an alternative to any of the foregoing embodiments, the wall portion is cylindrical in shape.

In addition to one or more of the features described above, or as an alternative to any of the foregoing embodiments, the wall portion extends between two end portions that are ring shaped.

In addition to one or more of the features described above, or as an alternative to any of the foregoing embodiments, the wall portion is conical in shape.

In addition to one or more of the features described above, or as an alternative to any of the foregoing embodiments, the wall portion is a linear panel and is rectangular in shape.

In addition to one or more of the features described above, or as an alternative to any of the foregoing embodiments, the component is a casing for the gas turbine engine.

In addition to one or more of the features described above, or as an alternative to any of the foregoing embodiments, the wall portion is cylindrical in shape and the wall portion extends between two end portions that are ring shaped.

Also disclosed is a method for forming a component configured for use in a gas turbine engine, including: stamping a sheet metal with a plurality of instances of a pre-defined three dimensional shape structed to increase a stiffness of the in a direction normal to the sheet metal, each instance of the plurality of instances of the pre-defined three dimensional shape being orientated at 90 degrees with respect to each other adjacent instance of the plurality of instances, wherein the three dimensional shape has a pair of curved distal peripheral end portions that are at opposite ends of the three dimensional shape and the pair of curved distal peripheral end portions are connected to each other by a pair of opposing concave peripheral portions that curve towards each other at a mid-section; and forming a wall portion from the stamped sheet metal, the wall portion extending between two end portions.

In addition to one or more of the features described above, or as an alternative to any of the foregoing embodiments, the wall portion is cylindrical in shape.

In addition to one or more of the features described above, or as an alternative to any of the foregoing embodiments, the wall portion extends between two end portions that are ring shaped.

In addition to one or more of the features described above, or as an alternative to any of the foregoing embodiments, the wall portion is a linear panel and is rectangular in shape.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the FIGS.

Figure 1:
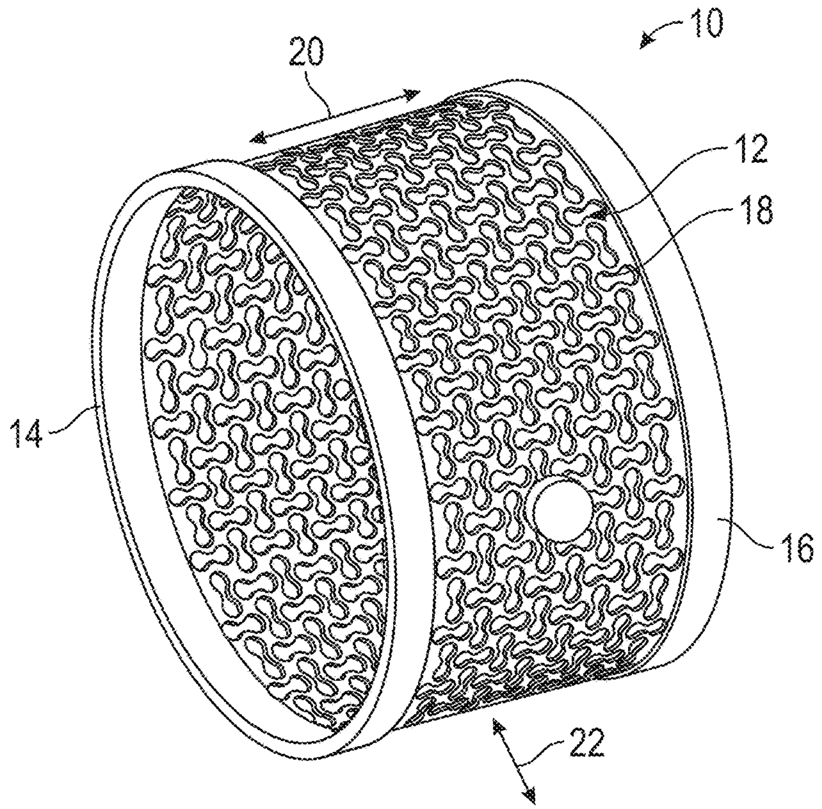
FIG. 1 is a perspective view of a structure for use in gas turbine engines with a structural reinforcement pattern in accordance with the present disclosure.

FIG. 1 illustrates a component or casing 10 configured for use in a gas turbine engine. As illustrated, the casing 10 is cylindrical in shape and has a wall portion 12 extending between two end portions 14 and 16, which are ring shaped. Although a cylindrical wall portion 12 and ring shaped end portions 14 and 16 are illustrated, various embodiments of the present disclosure are contemplated for use with any other suitable structures including but not limited to, flat walls, cylinders or cones. The wall portion 12 is formed from a sheet metal material that is stamped with a plurality of unique shapes or a plurality of instances of a pre-defined three dimensional shape 18 that when stamped into the sheet metal provide three dimensional depressions in the sheet metal that increase the stiffness of the casing 10 in a direction normal to the wall portion 12 (illustrated by arrows 22). In other words, the pre-defined three dimensional shape 18 is structured to increase a stiffness of the wall portion 12 in a direction normal to the wall portion 12. In addition, the buckling capacity of the casing or component 10 is increased in the direction illustrated by arrows 20 due to the increased stiffness in the direction of arrows 22. As such, the casing or component 10 is capable of supporting higher loads than a casing without any of the unique shapes or instances of the pre-defined three dimensional shape 18 stamped therein.

Although a casing is illustrated, the present disclosure is not limited to engine casings. For example, the component 10 with the unique shapes or instances of the pre-defined three dimensional shape 18 may be any suitable component that would benefit from the stiffness and enhanced dynamic behavior provided when the unique shapes 18 are stamped therein. Non-limiting examples of the component 10 may includes a heat shield, structural brackets, supporting brackets, mounting brackets, mounts, shields, enclosures, casings, heat shields (heat barrier walls), some internal walls for supporting seals, any device covers and equivalents thereof anyone of which may be flat or have a three dimensional shape.

By stamping these unique shapes or instances of a pre-defined three dimensional shape 18 into the wall portion 12 of the component or casing 10, the dynamic behavior of the wall portion 12 is improved and/or the ability of the wall portion 12 to carry lateral loads is increased. In other words, the three dimensional depressions of shapes 18 or instances of a pre-defined three dimensional shape 18 provide the aforementioned increase in the structural behavior of the casing or component 10. As used herein, the shapes 18 or instances of a pre-defined three dimensional shape 18 are depressed into one surface of the wall portion 12 during a stamping process and the shapes 18 or instances of the pre-defined three dimensional shape 18 protrude from an opposite side or surface of the wall portion 12.

In accordance with the present disclosure, the special shapes or instances of the pre-defined three dimensional shape 18 are stamped into the sheet metal to make it more rigid in certain directions. The three dimensional structure or the shape 18 or instances of the pre-defined three dimensional shape 18 generated by this method provides a significant increase of stiffness in a lateral direction of the sheet metal surface. The stamped structure can be created by making an isogrid or by stamping repeatable shapes following a certain pattern. As mentioned above, the stamped shapes improve the lateral and bending stiffness of the sheet metal, which also increases the natural frequency of the structure made of stamped sheet metal relative to a flat or unstamped sheet metal structure. In addition, and since the lateral and bending stiffness of the sheet metal is increased, additional or higher loads can be carried directly by the stamped sheet metal. This means components can be mounted directly to the stamped sheathing, which eliminates the need for adding ribs resulting in lighter and more complex construction.

Figure 2:
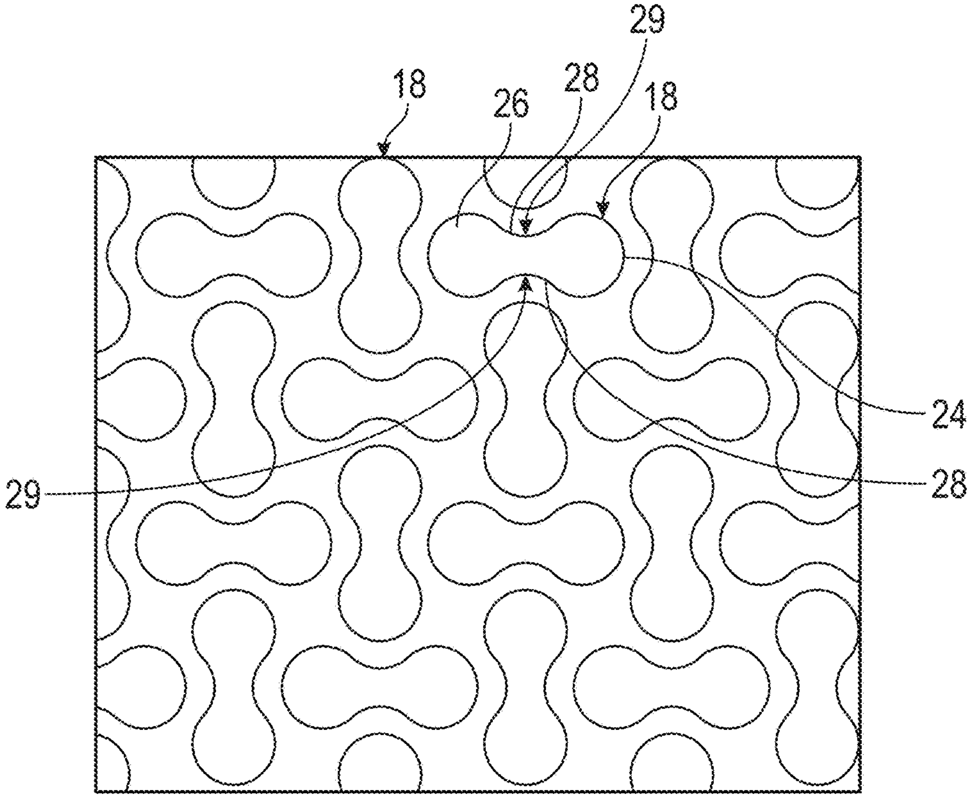
FIG. 2 illustrates the isogrid pattern employed in the structure illustrated in FIG. 1.

Referring now to at least FIGS. 1 and 2, the shapes or instances of a pre-defined three dimensional shape 18 and their orientation according to one embodiment of the present disclosure are illustrated. For example and as illustrated, the shapes 18 are a plurality of instances of a pre-defined three dimensional shape 18. As such, the plurality of instances include a plurality of instances of a pre-defined three dimensional shape 18. The plurality of instances of the pre-defined three dimensional shape 18 being orientated 90 degrees with respect to each other adjacent instance of the plurality of instances of the pre-defined three dimensional shape 18. As illustrated in FIGS. 1 and 2, each three dimensional shape 18 of the plurality of instances of the pre-defined three dimensional shape 18 has a pair of curved or circular distal peripheral end portions 24, 26 that are at opposite ends of the shape 18 and each of the curved or circular distal peripheral end portions 24, 26 are connected to each other by a pair of opposing concave or curved peripheral portions 28 that curve towards each other at a mid-section 29 of the pair of opposing concave or curved peripheral portions 28.

In other words, the peripheral portions of the shape 18 connecting the distal ends are concave with respect to the exterior of the shape. As such, each of the shapes have rounded peripheral end portions connected by a concave curved peripheral portion.

It being understood that the plurality of instances of the pre-defined three dimensional shape 18 are generally the same or of the same configuration however and due to manufacturing tolerances, each instance of the plurality of instances of the pre-defined three dimensional shape 18 may not be exactly the same. As such, the present disclosure is intended to cover instances of the pre-defined three dimensional shape 18 where due to manufacturing tolerances slight variances may occur. Not withstanding the above comments, the present disclosure is also intended to cover instances of the pre-defined three dimensional shape 18 where the plurality of instances of the pre-defined three dimensional shape 18 are identical.

In addition to the plurality of instances of the pre-defined three dimensional shape 18, it is also understood that that a plurality of instances of portions of the three dimensional shape 18 are also provided at the periphery of the wall portion 12 where there is not enough material to support the entire configuration of the pre-defined three dimensional shape 18. It is also understood that the plurality of instances of portions of the three dimensional shape 18 are intended to cover instances of portions of the three dimensional shape 18 where there are slight variations due to the aforementioned manufacturing tolerances and/or instances of portions of the pre-defined three dimensional shape 18 where the instances of portions of the pre-defined three dimensional shape 18 are identical.

These unique configurations as mentioned above when stamped into a sheet metal increase the lateral and bending stiffness of the sheet metal such that it is greater than the same sheet metal without any shape stamped therein.

Figure 3:
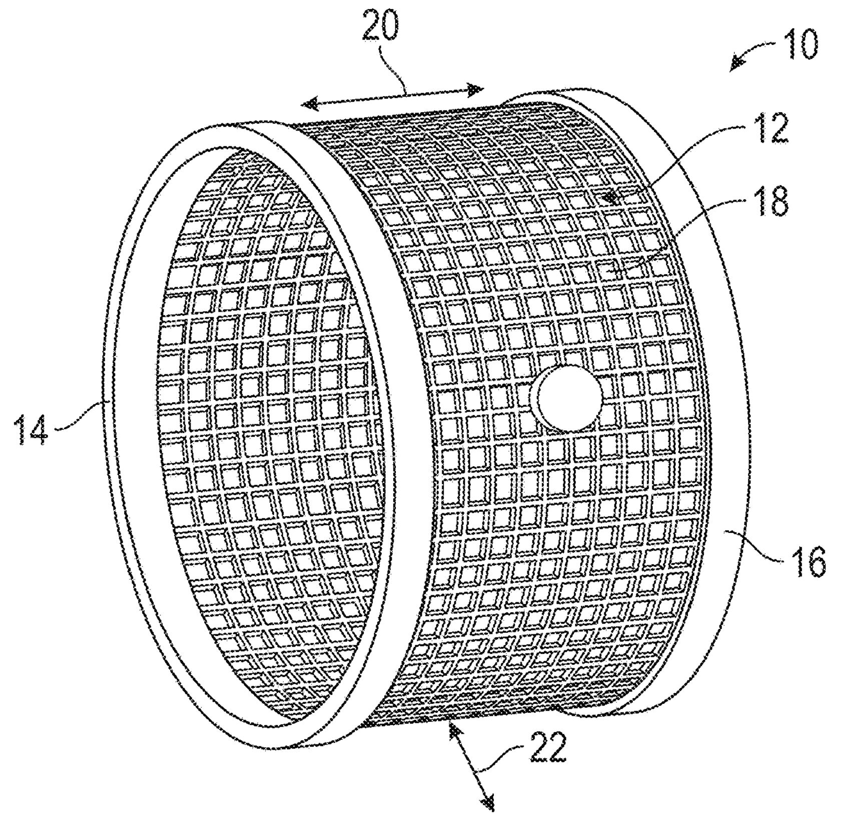
FIG. 3 is a perspective view of a structure for use in gas turbine engines with another structural reinforcement pattern in accordance with the present disclosure.
Figure 4:
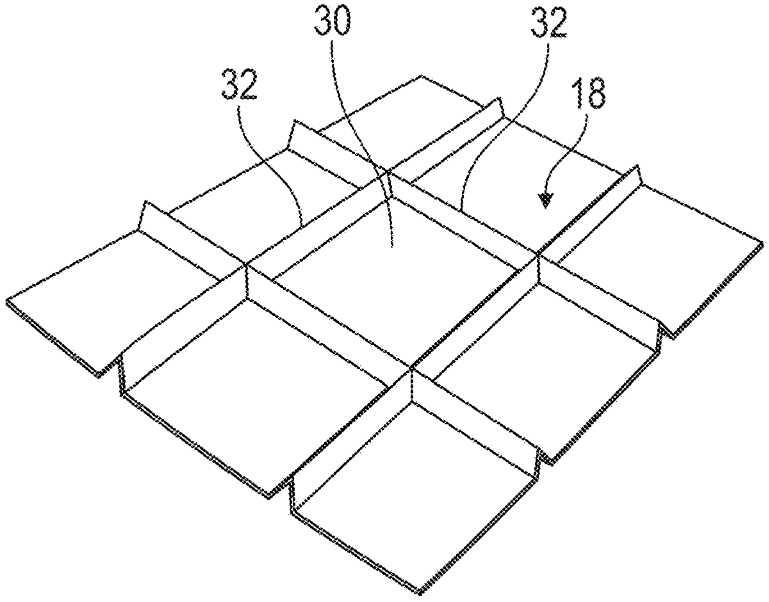
FIG. 4 illustrates the isogrid pattern employed in the structure illustrated in FIG. 2.

Referring now to FIGS. 3 and 4, an alternative casing or component 10 configured for use in a gas turbine engine is illustrated. As illustrated, the casing 10 is cylindrical in shape and has a wall portion 12 extending between two end portions 14 and 16, which are ring shaped. Although a cylindrical wall portion 12 and ring shaped end portions 14 and 16 are illustrated, various embodiments of the present disclosure are contemplated for use with any other suitable structures including but not limited to, flat walls, cylinders or cones or other configurations of the component 10 as mentioned above. The wall portion 12 is formed from a sheet metal material that is stamped with unique shapes 18 or a plurality of instances of a pre-defined three dimensional shape 18 that when stamped into the sheet metal increase the stiffness of the casing or component 10 in a direction normal to the wall portion 12 (illustrated by arrows 22). In addition, the buckling capacity of the casing or component 10 is increased in the direction illustrated by arrows 20 due to the increased stiffness in the direction of arrows 22.

By stamping these unique shapes or a plurality of instances of a pre-defined three dimensional shape 18 into the wall portion 12, the dynamic behavior of the wall portion 12 is improved and/or the ability of the wall portion 12 to carry lateral loads is increased.

In this configuration, the stamped shapes or the plurality of instances of the pre-defined three dimensional shape 18 are rectangles or squares 30 that are bounded by vertical walls 32.

Figure 6:
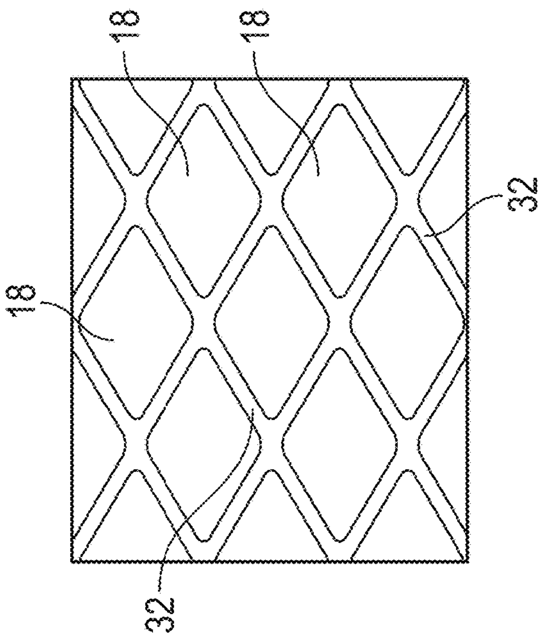
FIG. 6 illustrates the isogrid pattern employed in the structure illustrated in FIG. 5.
Figure 5:
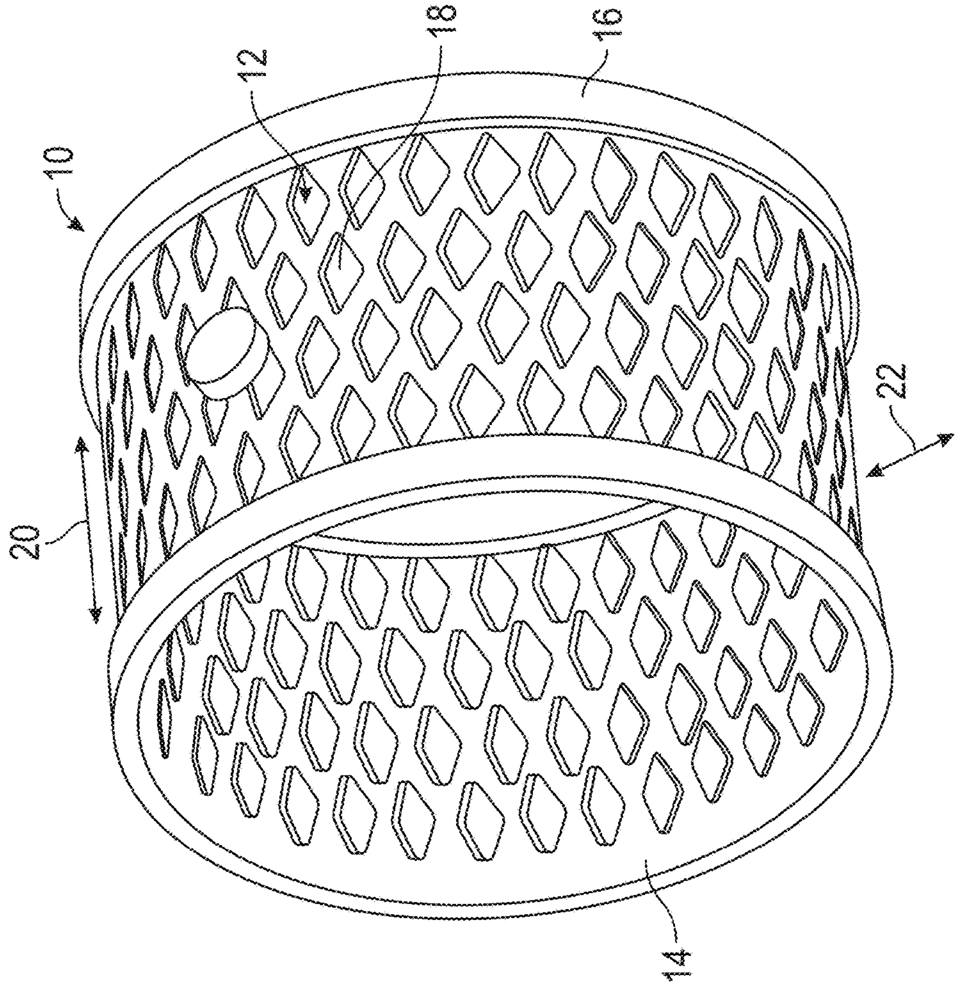
FIG. 5 is a perspective view of a structure for use in gas turbine engines with yet another structural reinforcement pattern in accordance with the present disclosure.

Referring now to FIGS. 5 and 6, an alternative casing or component 10 configured for use in a gas turbine engine is illustrated. As illustrated, the casing or component 10 is cylindrical in shape and has a wall portion 12 extending between two end portions 14 and 16, which are ring shaped. Although a cylindrical wall portion 12 and ring shaped end portions 14 and 16 are illustrated, various embodiments of the present disclosure are contemplated for use with any other suitable structures including but not limited to, flat walls, cylinders or cones or other configurations of the component 10 as mentioned above. The wall portion 12 is formed from a sheet metal material that is stamped with unique shapes 18 or a plurality of instances of a pre-defined three dimensional shape 18 that when stamped into the sheet metal increase the stiffness of the casing or component 10 in a direction normal to the wall portion 12 (illustrated by arrows 22). In addition, the buckling capacity of the casing or component 10 is increased in the direction illustrated by arrows 20 due to the increased stiffness in the direction of arrows 22.

By stamping these unique shapes 18 or the plurality of instances of the pre-defined three dimensional shape 18 into the wall portion 12, the dynamic behavior of the wall portion 12 is also improved and/or the ability of the wall portion 12 to carry lateral loads is increased.

In this configuration, the stamped shapes 18 or the plurality of instances of the pre-defined three dimensional shape 18 are diamond in shape. In this embodiment, the shapes 18 may also be referred to as a rhombus or a parallelogram. These shapes are also formed by vertical walls 32.

Figure 7:
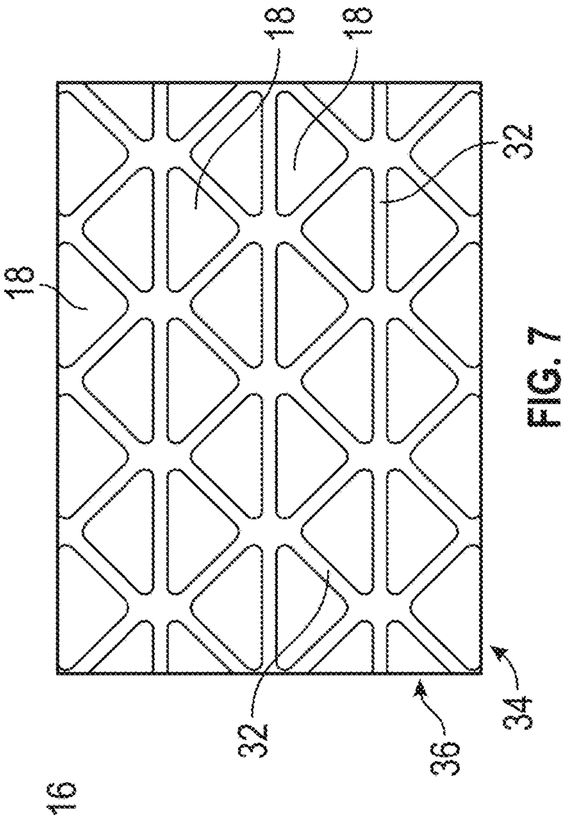
FIG. 7 illustrates another contemplated isogrid pattern capable of being employed in any of the aforementioned structures.

Referring now to FIG. 7, an alternative configuration of the stamped shapes 18 or a plurality of instances of a pre-defined three dimensional shape is illustrated. In this embodiment, the shapes 18 or the plurality of instances of the pre-defined three dimensional shape 18 are triangular and the repeating pattern may be referred to as a series of rows of shapes 18 comprising a first row 34 of shapes 18 and a second row 36 of shapes 18, wherein the second row 36 is inverted with respect to the first row 34.

Figure 8:
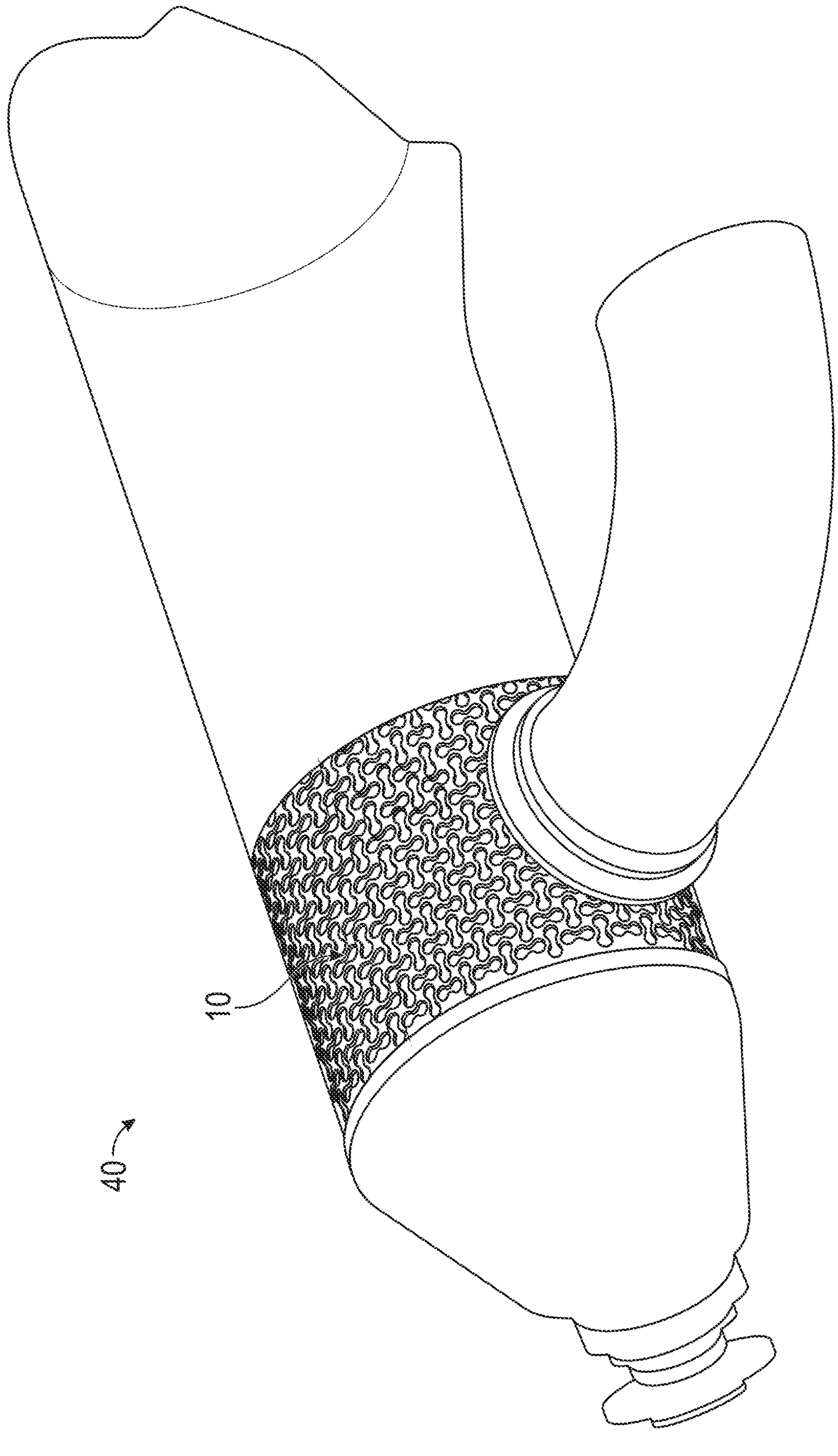
FIG. 8 illustrates a portion of a gas turbine engine with a structure or casing having a structural reinforcement pattern in accordance with the present disclosure.

FIG. 8 illustrates a portion of a gas turbine engine 40 with the casing or component 10 in accordance with the present disclosure.

Figure 9:
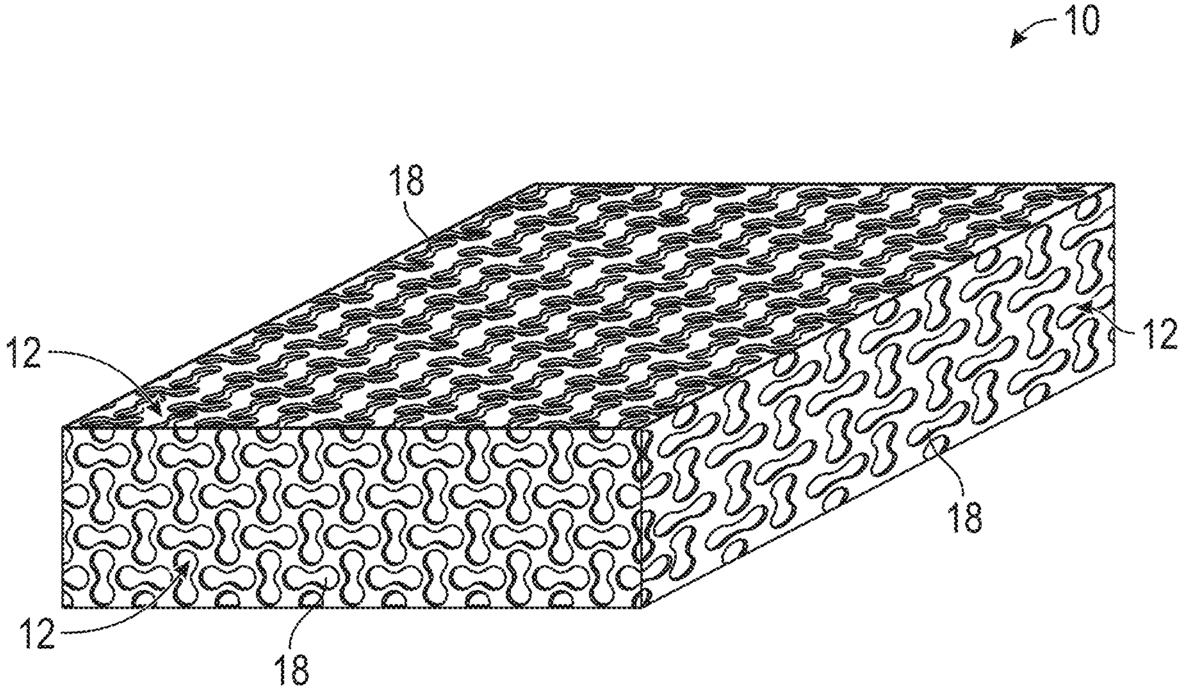
FIG. 9 is a generic representation of a component having wall portions with a plurality of shapes stamped therein using an isogrid pattern in accordance with the present disclosure.

FIG. 9 is a generic representation of a component 10 having wall portions 12 with a plurality of shapes 18 or a plurality of instances of the pre-defined three dimensional shape 18 stamped therein using an isogrid pattern.

As mentioned above and in any of the aforementioned embodiments, it is understood that the plurality of instances of the pre-defined three dimensional shape 18 are generally the same or of the same configuration however and due to manufacturing tolerances, each instance of the plurality of instances of the pre-defined three dimensional shape 18 may not be exactly the same. As such, the present disclosure is intended to cover instances of the pre-defined three dimensional shape 18 where due to manufacturing tolerances slight variances may occur. Not withstanding the above comments, the present disclosure is also intended to cover instances of the pre-defined three dimensional shape 18 where the plurality of instances of the pre-defined three dimensional shape 18 are identical.

In addition to the plurality of instances of the pre-defined three dimensional shape 18, it is also understood that that a plurality of instances of portions of the three dimensional shape 18 are also provided at the periphery of the wall portion 12 where there is not enough material to support the entire configuration of the pre-defined three dimensional shape 18. It is also understood that the plurality of instances of portions of the three dimensional shape 18 are intended to cover instances of portions of the three dimensional shape 18 where there are slight variations due to the aforementioned manufacturing tolerances and/or instances of portions of the pre-defined three dimensional shape 18 where the instances of portions of the pre-defined three dimensional shape 18 are identical.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A component configured for use in a gas turbine engine, comprising:
- a wall portion formed from sheet metal and extending between two end portions, the wall portion being stamped with a plurality of instances of a pre-defined three dimensional shape structured to increase a stiffness of the wall portion in a direction normal to the wall portion, each instance of the plurality of instances of the pre-defined three dimensional shape being orientated at 90 degrees with respect to each other adjacent instance of the plurality of instances, wherein the three dimensional shape has a pair of curved distal peripheral end portions that are at opposite ends of the three dimensional shape and each pair of curved distal peripheral end portions are connected to each other by a pair of opposing concave peripheral portions that curve towards each other at a mid-section.

2. The component as in claim 1, wherein the wall portion is cylindrical in shape.

3. The component as in claim 2, wherein the wall portion extends between two end portions that are ring shaped.

4. The component as in claim 1, wherein the wall portion is conical in shape.

5. The component as in claim 1, wherein the wall portion is a linear panel and is rectangular in shape.

6. The component as in claim 1, wherein the component is a casing for the gas turbine engine.

7. The component as in claim 6, wherein the wall portion is cylindrical in shape.

8. The component as in claim 6, wherein the wall portion extends between two end portions that are ring shaped.

9. The component as in claim 6, wherein the wall portion is conical in shape.

10. A portion of a gas turbine engine, comprising:
- a component, the component including a wall portion formed from sheet metal and extending between two end portions, the wall portion being stamped with a plurality of instances of a pre-defined three dimensional shape structured to increase a stiffness of the wall portion in a direction normal to the wall portion, each instance of the plurality of instances of the pre-defined three dimensional shape being orientated 90 degrees with respect to each other adjacent instance of the plurality of instances, wherein the three dimensional shape has a pair of curved distal peripheral end portions that are at opposite ends of the three dimensional shape and each pair of curved distal peripheral end portions are connected to each other by a pair of opposing concave peripheral portions that curve towards each other at a mid-section.

11. The portion of the gas turbine engine as in claim 10, wherein the wall portion is cylindrical in shape.

12. The portion of the gas turbine engine as in claim 11, wherein the wall portion extends between two end portions that are ring shaped.

13. The portion of the gas turbine engine as in claim 10, wherein the wall portion is conical in shape.

14. The portion of the gas turbine engine in claim 10, wherein the wall portion is a linear panel and is rectangular in shape.

15. The portion of the gas turbine engine in claim 10, wherein the component is a casing for the gas turbine engine.

16. The portion of the gas turbine engine as in claim 15, wherein the wall portion is cylindrical in shape and the wall portion extends between two end portions that are ring shaped.

17. A method for forming a component configured for use in a gas turbine engine, comprising:
- stamping a sheet metal with a plurality of instances of a pre-defined three dimensional shape structured to increase a stiffness of the sheet metal in a direction normal to the sheet metal, each instance of the plurality of instances of the pre-defined three dimensional shape being orientated at 90 degrees with respect to each other adjacent instance of the plurality of instances, wherein the three dimensional shape has a pair of curved distal peripheral end portions that are at opposite ends of the three dimensional shape and the pair of curved distal peripheral end portions are connected to each other by a pair of opposing concave peripheral portions that curve towards each other at a mid-section; and forming a wall portion from the stamped sheet metal, the wall portion extending between two end portions.

18. The method as in claim 17, wherein the wall portion is cylindrical in shape.

19. The method as in claim 18, wherein the wall portion extends between two end portions that are ring shaped.

20. The method as in claim 17, wherein the wall portion is a linear panel and is rectangular in shape.

* * * * *